(12) United States Patent
Kluge et al.

(10) Patent No.: US 8,965,301 B2
(45) Date of Patent: *Feb. 24, 2015

(54) DISTANCE MEASUREMENT BETWEEN TWO NODES OF A RADIO NETWORK

(71) Applicant: Atmel Corporation, San Jose, CA (US)

(72) Inventors: Wolfram Kluge, Dresden (DE); Eric Sachse, Leipzig (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,939

(22) Filed: Feb. 3, 2014

(65) Prior Publication Data

US 2014/0248841 A1    Sep. 4, 2014

Related U.S. Application Data

(63) Continuation of application No. 12/649,163, filed on Dec. 29, 2009, now Pat. No. 8,644,768.

(60) Provisional application No. 61/141,490, filed on Dec. 30, 2008.

(30) Foreign Application Priority Data

Dec. 30, 2008    (DE) .......................... 10 2008 063 255

(51) Int. Cl.
*H04B 17/00*    (2006.01)
*H04W 24/06*    (2009.01)
(Continued)

(52) U.S. Cl.
CPC ............... *H04W 24/06* (2013.01); *G01S 11/02* (2013.01); *G01S 13/84* (2013.01)
USPC .................. 455/67.11; 455/67.14; 455/67.16; 455/260; 455/258

(58) Field of Classification Search
CPC ................................ H04B 17/00; H04B 24/06
USPC .................. 455/67.16, 67.11, 67.4, 260, 258
See application file for complete search history.

(56) References Cited

U.S. PATENT DOCUMENTS 2,529,510 A    11/1950   Manley
3,713,149 A *   1/1973   Bruner et al. .................. 342/88
(Continued)

FOREIGN PATENT DOCUMENTS

CN           101320090 A    12/2008
DE             2746776 A1    4/1979
(Continued)

OTHER PUBLICATIONS

Guan-Chyun Hsieh et al., "Phase-Locked Loop Techniques—A Survey", IEEE Transactions on Industrial Electronics, vol. 43, Nr 6, Dec. 6, 1996, pp. 609-615.

(Continued)

*Primary Examiner* — Temesgh Ghebretinsae
*Assistant Examiner* — Md Talukder
(74) *Attorney, Agent, or Firm* — Fish & Richardson P.C.

(57) ABSTRACT

A method includes transmitting, by a first node, a first carrier signal and receiving, from a second node, which receives the first carrier signal, a second carrier signal. The first node measures first and second values of a first phase, the first value assigned to a first frequency of the second carrier signal and the second value assigned to a second frequency of the second carrier signal. The first and second frequencies have a frequency difference. A third value of a second phase is assigned to a third frequency of the first carrier signal, and a fourth value of the second phase is assigned to a fourth frequency of the first carrier signal. The third and fourth frequencies have the frequency difference. A distance between the first and second nodes is determined from the frequency difference from the first and second values and from the third and fourth values.

19 Claims, 3 Drawing Sheets

(51) Int. Cl.
*G01S 11/02* (2010.01)
*G01S 13/84* (2006.01)

(56) References Cited

U.S. PATENT DOCUMENTS

| | | | |
|---|---|---|---|
| 3,725,920 A * | 4/1973 | Kupfer et al. | 342/125 |
| 4,283,726 A | 8/1981 | Spence et al. | |
| 4,757,315 A | 7/1988 | Lichtenberg et al. | |
| 4,804,961 A * | 2/1989 | Hane | 342/125 |
| 5,038,117 A * | 8/1991 | Miller | 331/16 |
| 5,082,364 A | 1/1992 | Russell | |
| 5,220,332 A * | 6/1993 | Beckner et al. | 342/125 |
| 5,723,911 A | 3/1998 | Glehr | |
| 6,067,039 A * | 5/2000 | Pyner et al. | 342/125 |
| 6,108,315 A | 8/2000 | Freeburg et al. | |
| 6,181,944 B1 * | 1/2001 | Uebayashi et al. | 455/456.2 |
| 6,373,434 B1 | 4/2002 | Hayakawa | |
| 6,731,908 B2 * | 5/2004 | Berliner et al. | 455/67.11 |
| 7,061,369 B2 * | 6/2006 | Bergerhoff | 340/5.61 |
| 7,209,071 B1 * | 4/2007 | Boring | 342/42 |
| 8,270,905 B1 | 9/2012 | Cahill et al. | |
| 8,405,543 B2 | 3/2013 | Kluge | |
| 8,644,768 B2 * | 2/2014 | Kluge et al. | 455/67.16 |
| 2002/0094786 A1 * | 7/2002 | Berliner et al. | 455/67.4 |
| 2003/0090365 A1 | 5/2003 | Bergerhoff | |
| 2005/0190098 A1 * | 9/2005 | Bridgelall et al. | 342/118 |
| 2005/0237953 A1 * | 10/2005 | Carrender et al. | 370/278 |
| 2006/0116837 A1 | 6/2006 | Hager et al. | |
| 2007/0002932 A1 | 1/2007 | Shirai et al. | |
| 2008/0116877 A1 | 5/2008 | Giubbini et al. | |
| 2009/0017782 A1 | 1/2009 | Monat et al. | 455/130 |
| 2010/0013711 A1 * | 1/2010 | Bartlett | 342/442 |
| 2010/0165866 A1 * | 7/2010 | Sachse et al. | 370/252 |
| 2010/0167661 A1 * | 7/2010 | Kluge et al. | 455/67.16 |
| 2010/0167662 A1 * | 7/2010 | Kluge et al. | 455/67.16 |
| 2010/0207820 A1 * | 8/2010 | Kawano et al. | 342/393 |
| 2010/0321245 A1 * | 12/2010 | Aoki | 342/458 |
| 2011/0006942 A1 * | 1/2011 | Kluge et al. | 342/125 |
| 2011/0187600 A1 * | 8/2011 | Landt | 342/458 |
| 2012/0176227 A1 * | 7/2012 | Nikitin | 340/10.2 |
| 2013/0155887 A1 * | 6/2013 | Sachse et al. | 370/252 |

FOREIGN PATENT DOCUMENTS

| | | |
|---|---|---|
| DE | 101 61 507 A1 | 7/2003 |
| DE | 102004042231 A | 3/2006 |
| WO | WO02/01247 A2 | 1/2002 |

OTHER PUBLICATIONS

Office Action and English Translation for Chinese Patent Application 200910263718.9, Jan. 30, 2012.
Communication No. 09 015 917.9-2220, issued by the EPO according to Article 94(4) EPC, German and English translation, Sep. 24, 2012.
Office Action and English translation for German Patent Application 10 2009 060 593.2, Sep. 21, 2011.
Office Action for Chinese Patent Appln. 200910262544.4, Dec. 31, 2011.
Office Action for Chinese Patent Appln. 200910263720.6, Apr. 23, 2012.
Office Action for German Patent Appln. 10 2009 060 591.6 (with translation), Jul. 12, 2011.
Office Action for German Patent Appl. 10 2009 060 592 (with translation), Sep. 19, 2011.
W. Kluge, U.S. Appl. No. 12/649,133, Non-Final Rejection, Mar. 16, 2012.
W. Kluge, U.S. Appl. No. 12/649,133, Response to Non-Final Rejection, Jun. 12, 2012.
W. Kluge, U.S. Appl. No. 12/649,133, Final Rejection, Aug. 30, 2012.
W. Kluge, U.S. Appl. No. 12/649,133, Notice of Appeal with Pre-Brief Conf. Req., Dec. 31, 2012.
W. Kluge, U.S. Appl. No. 12/649,133, Pre-Brief Appeal Conference Decision, Feb. 21, 2013.
W. Kluge, U.S. Appl. No. 12/649,133, Appeal Brief, Mar. 21, 2013.
W. Kluge, U.S. Appl. No. 12/649,133, Examiner's Answer to Appeal Brief, Apr. 10, 2013.
W. Kluge, U.S. Appl. No. 12/649,133, Reply Brief, Jun. 10, 2013.
W. Kluge, U.S. Appl. No. 12/649,133, Appeal Docketing Notice, Jul. 1, 2013.
W. Kluge, U.S. Appl. No. 12/649,163, App. Response to Pre-Exam Form, Mar. 15, 2010.
W. Kluge, U.S. Appl. No. 12/649,163, Non-Final Rejection, Dec. 3, 2012.
W. Kluge, U.S. Appl. No. 12/649,163, Response to Non-Final Rejection, Dec. 3, 2012.
W. Kluge, U.S. Appl. No. 12/649,163, Final Rejection, Apr. 9, 2013.
W. Kluge, U.S. Appl. No. 12/649,163, Response to Final Rejection and Terminal Disclaimers, Sep. 9, 2013.
W. Kluge, U.S. Appl. No. 12/649,163, Terminal Disclaimer Review Decision, Sep. 24, 2013.
W. Kluge, U.S. Appl. No. 12/649,163, Notice of Allowance, Oct. 1, 2013.
W. Kluge, U.S. Appl. No. 12/649,163, Issue Fee Payment, Dec. 30, 2013.
W. Kluge, U.S. Appl. No. 12/649,163, Issue Notification, Jan. 15, 2014.
W. Kluge, U.S. Appl. No. 12/649,205, Non-Final Rejection, Jun. 8, 2012.
W. Kluge, U.S. Appl. No. 12/649,205, Response to Non-Final Rejection. Notice of Allowance, Oct. 2, 2012.
W. Kluge, U.S. Appl. No. 12/649,205, Notice of Allowance, Nov. 28, 2012.
W. Kluge, U.S. Appl. No. 12/649,205, Issue Notification, Mar. 6, 2013.

* cited by examiner

DISTANCE MEASUREMENT BETWEEN TWO NODES OF A RADIO NETWORK

PRIORITY CLAIM

This application is a continuation, under 35 U.S.C. §120 of U.S. patent application Ser. No. 12/649,163, filed Dec. 29, 2009, which claims the benefit, under 35 U.S.C. §119(e), of U.S. Provisional Patent Application No. 61/141,490, filed Dec. 30, 2008, and also claims the benefit, under 35 U.S.C. §119(a), of German Patent Application No. 102008063255.4, also filed Dec. 30, 2008, all of which are incorporated herein by reference in their entirety.

BACKGROUND

1. Technical Field

The present invention relates to a system, a method, and a circuit for distance measurement between two nodes of a radio network.

2. Description of the Background

In a radio network, it is desirable to locate the nodes of the radio network or to determine at least one distance between the nodes. As a result, for example, a defective node can be easily found. Slow movements of nodes, for example, a means of conveyance in a factory, can also be tracked. A locating of the nodes can also be used advantageously in firefighting, when the nodes dropped by an airplane can be located and a locally increased temperature transmitted.

U.S. Pat. No. 5,220,332 discloses a distance measuring system which has an interrogator and a transponder and enables the nonsimultaneous measurement between two objects. A carrier signal is modulated with a (low-frequency) modulation signal with a variable modulation frequency to determine by a phase measurement or alternatively by a transit time measurement a distance between the interrogator and the transponder from the change in the modulation signal.

International Pat. Appl. No. WO 02/01247 A2 discloses a method for measuring the distance between two objects with the use of electromagnetic waves. An interrogation signal of a base station and a response signal of a portable code emitter are transmitted twice at different carrier frequencies. The carrier frequencies in this case are correlated; i.e., they are dependent on one another. The carrier frequencies are approximated to one another, so that a phase shift between the signals can be measured. The distance of the code emitter to the base station is calculated from this phase shift. The interrogation signal and the response signal can be transmitted at different carrier frequencies or at the same carrier frequencies. The carrier frequencies are altered for a renewed interrogation/response dialog.

If a transceiver of a node for a sensor network is laid out according to the industry standard 802.15.4 for a half-duplex system, it cannot transmit and receive simultaneously. If said transceiver is to be used as an active reflector for phase measurement, the node therefore must store the phase of the received signal, for example, by a phase-locked loop and after switching from receiving to transmitting again use the same stored phase for transmitting. For example, during reception by an additional phase-locked loop, the crystal oscillator of the transceiver of the node functioning as the active reflector is adjusted so that the frequency and phase of the LO signal (LO—Local Oscillator) of the local oscillator match the receive signal. During switching to transmission, the additional phase-locked loop must be opened and the crystal oscillator now synchronized in frequency runs freely further. As a result, the transceiver of the node functioning as the active reflector transmits with the same or proportional phase position and with the same frequency, as it previously had received a carrier signal. In this respect, very high requirements are placed on a free-running oscillator with regard to frequency stability and phase stability. Disturbances must be avoided, such as, for example, crosstalk of signals in the integrated circuit, which can cause phase changes.

U.S. Pat No. 6,731,908 B2 discloses a method for determining the distance between two objects for Bluetooth technology. In this case, the frequency is changed by frequency hops to measure a phase offset for multiple different frequencies. An object has a voltage-controlled crystal oscillator in a phase-locked loop (PLL), whereby the phase-locked loop is closed during the receiving and opened during the transmission, so that the receive signal and transmit signal have the same frequency. The phase of the local oscillator signal of the voltage-controlled crystal oscillator due to the synchronization by the PLL is thereby coherent to the received signal.

SUMMARY

It is therefore an object of the present invention to provide as improved a method for distance measurement as possible. Accordingly, a method for distance measurement between two nodes of a radio network is provided.

In the method, a first unmodulated carrier signal is transmitted by the first node and received by the second node. In addition, a second unmodulated carrier signal is transmitted by the second node and received by the first node. An unmodulated carrier signal is, for example, a high-frequency sinusoidal oscillation.

A first value and a second value of a first phase are measured by the first node. The measurements in this case are made preferably in the intermediate frequency domain. The first value of the first phase is assigned to a first frequency of the received second carrier signal. The second value of the first phase is assigned to a second frequency of the received second carrier signal. The first frequency and the second frequency have a frequency difference. The frequency difference in this regard is sufficiently large to measure phase differences, based on this frequency difference. Preferably, the frequency difference is defined by a frequency spacing of channels in the radio network.

A third value and a fourth value of a second phase are measured by the second node. The measurements in this case are made preferably in the intermediate frequency domain. The third value of the second phase is assigned to a third frequency of the received first carrier signal. The fourth value of the second phase is assigned to a fourth frequency of the received first carrier signal. The third frequency and the fourth frequency also have the frequency difference. In this regard, it is possible that the first frequency and the third frequency are the same, so that then the second frequency and the fourth frequency can also be the same. Alternatively, both the first frequency and the third frequency as well as the second frequency and the fourth frequency are different. For example, the first frequency and the third frequency differ by one or more frequency spacings of channels (channel spacings) of the radio network.

The distance can be determined from the frequency difference, from the first value and the second value of the first phase, and from the third value and fourth value of the second phase. In this regard, use is preferably made of the fact that the distance is proportional to a ratio of the phase difference to the frequency difference. Preferably, (precisely) one distance value is determined from the frequency difference, from the first value and the second value of the first phase, and from the third value and fourth value of the second phase. Preferably, the distance is calculated from a majority of distance values, particularly by averaging.

The object of the invention is to simplify a system for distance measurement in a radio network as much as possible. Accordingly, a system for distance measurement between two nodes of a radio network is provided. The radio network is advantageously formed according to the industry standard IEEE 802.15.4. The distance measurement in this case can occur between any two nodes of the radio network, which are formed and set up for distance measurement.

The distance measurement in this regard can occur between a first node and a second node. The first node in a mode for distance measurement is set up to transmit a first unmodulated carrier signal and to receive a second unmodulated carrier signal; the second node in a mode for distance measurement is set up to transmit the second unmodulated carrier signal and to receive the first unmodulated carrier signal.

The first node has a first phase measurement unit for measuring a first value and a second value of a first phase of the received second carrier signal.

The first value of the first phase is assigned to a first frequency of the received second carrier signal. The second value of the first phase is assigned to a second frequency of the received second carrier signal.

The first frequency and the second frequency have a frequency difference.

The second node has a second phase measurement unit for measuring a third value and a fourth value of a second phase of the received first carrier signal.

The third value of the second phase is assigned to a third frequency of the received first carrier signal. The fourth value of the second phase is assigned to a fourth frequency of the received first carrier signal.

The third frequency and the fourth frequency also have the frequency difference. In a first variant, the first frequency is lower than the second frequency by the frequency difference, and the third frequency is lower than the fourth frequency by the frequency difference. In a second variant, the first frequency is higher than the second frequency by the frequency difference, and the third frequency is higher than the fourth frequency by the frequency difference.

The first node and/or the second node and/or another node are set up to determine the distance from the frequency difference, from the first value and the second value of the first phase, and from third value and the fourth value of the second phase. Preferably, the frequency difference, the first value and the second value of the first phase, and the third value and the fourth value of the second phase are transmitted to the node that determines the distance, provided it has not already been measured or is known in this node.

The invention has as its object, further, to provide a circuit of a radio network node for distance measurement. Accordingly, a circuit is provided that is set up for distance measurement for a radio network node. The circuit in this case is set up to carry out, particularly to initiate, a distance measurement to another node of the radio network.

The circuit has a transmitter/receiver circuit for transmitting a first unmodulated carrier signal and for receiving a second unmodulated carrier signal. The first unmodulated carrier signal in this regard can be transmitted with different frequencies.

The circuit has a reference clock generator for a phase-locked loop for generating a local oscillator signal. The reference clock generator preferably has a freely oscillating crystal oscillator. The local oscillator signal is used for downmixing the received second carrier signal to an intermediate frequency signal by the transmitter/receiver circuit. The phase-locked loop is connected to the transmitter/receiver circuit to downmix the received radio signal to an intermediate frequency signal by means of the oscillator signal by the transmitter/receiver circuit.

The circuit has a frequency divider, which is connected to the reference clock generator to generate a comparison signal by dividing a reference frequency of a reference signal of the reference generator. Preferably, a division factor of the frequency divider is even-numbered. The phase of the reference signal in this regard is maintained by the division by the frequency divider for the comparison signal.

The circuit has a phase measurement circuit, which to evaluate a phase between the intermediate frequency signal and the comparison signal is connected to the transmitter/receiver circuit and the frequency divider. The phase of the comparison signal is used in this regard as a reference to which the phase of the intermediate frequency signal is measured. The intermediate frequency signal in this regard has the same phase position as the received second carrier signal. The measurement of the phase can occur, for example, by means of clock counting.

The circuit has a control circuit, which is connected to the phase measurement unit and is set up to control the time-synchronized measurement times for measuring a first value and a second value of the phase. The first value in this respect is assigned to a first frequency of the received second carrier signal and the second value to a second frequency of the received second carrier signal. The first frequency and the second frequency have a frequency difference. The measurement times can be predefined, for example, or set by agreement (between nodes).

Preferably, to determine the distance, the circuit is set for receiving and/or transmitting measured values of the phase of/to another node. Furthermore, the circuit can be set up to determine the distance from the frequency difference, from the measured first value and the measured second value of the phase, and from phase values received by another node. The received values in so doing are transmitted from a node to the circuit, where the distance can be determined by the circuit.

The embodiments described hereinafter refer to the system, as well as to the method and the circuit. The functions of the circuit and of the system in this respect emerge from the method features; the method features emerge from the functions of the system or the circuit.

An embodiment provides that a time synchronization of the measurements of the values is performed. The time synchronization in this regard is performed in such a way that measurement times of the measurements of the values, therefore of the first, second, third, and fourth value, have a predefined temporal relationship to one another.

It is especially preferred that a first time interval and a second time interval are the same. Preferably, the first time interval between a first measurement time of the first value of the first phase and a second measurement time of the second value of the first phase is defined. The second time interval between a third measurement time of the third value of the second phase and a fourth measurement time of the fourth value of the second phase is preferably defined. This temporal relationship has the effect that a third time interval as well between the first measurement time and the third measurement time is the same as a fourth time interval between the second measurement time and the fourth measurement time.

The time intervals can be predefined. The time intervals are therefore not determined first from the ongoing measurement. The time intervals can be fixedly predefined, for example, implemented as a set of parameters. Alternatively, the time intervals for a distance measurement as well can be agreed upon between the nodes. To this end, the nodes are set up accordingly. Advantageously, the nodes are set up to measure the values of the phases at the time intervals by storing the phase value current at the measurement time, the values of the phases being determined continuously. Alternatively, the nodes are set up to measure the values of the phase only at the measurement time and to store the measured value.

In an embodiment, to determine the distance, a phase difference is calculated from the first value and the second value of the first phase and from the third value and fourth value of the second phase. The calculation is preferably performed using the formula:

$$\Delta\phi = (\phi_{A2} - \phi_{B2}) - (\phi_{A1} - \phi_{B1})$$

Here, the formula naturally also comprises all algebraic transformations of its terms. In the formula, $\phi A1$ is the first value and $\phi A2$ is the second value of the first phase. $\phi B1$ is the third value and $\phi B2$ is the fourth value of the second phase.

According to an embodiment, the first unmodulated carrier signal is generated by means of a first oscillator signal by a first reference clock generator and a first phase-locked loop of the first node. Further, the second unmodulated carrier signal can be generated by means of a second oscillator signal by a second reference clock generator and a second phase-locked loop of the second node.

The first value and the second value of the first phase of the received second carrier signal of the second node are measured relative to a first reference signal of the first reference clock generator by a phase measurement circuit of the first node. The third value and the fourth value of the second phase of the received first carrier signal of the first node are measured relative to a second reference signal of the second reference clock generator by a phase measurement unit of the second node. The measurements in this case are made preferably in the intermediate frequency domain.

If the first reference clock generator and the second reference clock generator generate the first reference signal and the second reference signal with a different frequency, the lack of frequency synchronization of the reference clock generator causes a time-dependent phase error. To eliminate the phase error when the distance between the nodes is determined, preferably the measurements of the first value and the second value of the first phase and of the third value and the fourth value of the second phase in the first node and in the second node are synchronized in time by a temporal predefined relationship of the four measurement times.

According to an embodiment, a first reference frequency of the first reference clock generator and a second reference frequency of the second reference clock generator are unsynchronized for the distance measurement. The reference clock generators are not coupled, so that the first reference frequency and the second reference frequency can be different. In contrast to synchronized frequency generators, the first oscillator signal and the second oscillator signal have no fixed frequency relationship to one another.

A first reference frequency of the first reference clock generator and a second reference frequency of the second reference clock generator can be generated unsynchronized for the distance measurement. The arising phase error in this case can be eliminated by fixed measurement times.

According to an embodiment, a phase error caused by the first reference frequency and by the second reference frequency generated particularly in an unsynchronized manner is compensated. The phase error can be unsynchronized in that by subtraction of the first value from the second value of the first phase and the third value from the fourth value of the second phase, the phase error is predominantly cancelled.

For example, the first carrier signal and the second carrier signal have the same frequency. Alternatively, the first frequency of the first carrier signal and the third frequency of the second carrier signal are different. The first frequency of the first carrier signal and the third frequency of the second carrier signal can differ by the amount of an intermediate frequency.

According to an embodiment, it is provided that the first node has a first control circuit and the second node a second control circuit for time synchronization of the measurements. The first control circuit is set up to control a first measurement time of the first value of the first phase and a second measurement time of the second value of the first phase. To this end, the first control circuit transmits, for example, a trigger pulse as a control signal to the first phase measurement unit.

Accordingly, the second control circuit can be set up to control a third measurement time of the third value of the second phase and a fourth measurement time of the fourth value of the second phase. To this end, the second control circuit transmits, for example, a trigger pulse as a control signal to the second phase measurement unit. A first time interval between the first measurement time and the second measurement time and a second time interval between the third measurement time and the fourth measurement time are same.

In a first embodiment variant, the time interval is fixedly predefined and is, for example, a fixed number of clocks of the reference clock generator. In a second alternative embodiment variant, the time interval is to be agreed upon between the first node and the second node. For the agreement on the time interval, for example, the first node transmits a respective parameter to the second node, which sets the time interval based on the parameter. For example, the end value of a timer is set by the parameter.

According to an embodiment, the first node has a first reference clock generator for a first phase-locked loop for generating a first oscillator signal. The oscillator signal is also called an LO signal (LO—Local Oscillator). The first node has a first transmitter/receiver circuit, which provides the first oscillator signal. For example, the first phase-locked loop is connected to a first mixer of the first transmitter/receiver circuit for downmixing the received second carrier signal by means of the first oscillator signal. Likewise, the first oscillator signal can be used to generate a first carrier frequency for transmission of the first carrier frequency. The first oscillator signal has a first oscillator frequency. The first oscillator frequency can preferably be adjusted by means of a first multiplier factor of the first phase-locked loop, for example, in steps.

The second node can have a second reference clock generator for a second phase-locked loop for generating a second oscillator signal with a second oscillator frequency. The second oscillator frequency can preferably be adjusted by means of a second multiplier factor of the second phase-locked loop, for example, in steps.

The first node and the second node can be set up for a time-delayed transmission of the first carrier signal and the second carrier signal. Preferably, the first node is formed to measure the first value and the second value of the first phase of the received second carrier signal relative to a first reference signal of the first reference clock generator. The reference signal can also be called a reference clock.

The second node is formed to measure the third value and the fourth value of the second phase of the received first carrier signal relative to a second reference signal of the second reference clock generator. Preferably, the values of the first phase and the second phase are measured in the intermediate frequency domain, in that the received first carrier signal and accordingly the received second carrier signal are downmixed by a mixer of a transmitter/receiver circuit of the particular node. Advantageously, a plurality of measurements are made for a plurality of carrier frequencies, whereby the first node is set up to measure in each case the first value and the second value of the first phase, and whereby the second node is set up to measure in each case the third value and the fourth value of the second phase. Therefore, preferably, a series of phase values is measured, whereby the measurement is made for a series of different frequencies of the first carrier signal and for a series of different frequencies of the second carrier signal.

If the first reference clock generator and the second reference clock generator generate the first reference signal and the second reference signal with a different frequency, the lack of frequency synchronization causes a time-dependent phase error. To eliminate the phase error when the distance between the nodes is determined, the first node and the second node are set up for time synchronization of the measurements of the first value and the second value of the first phase and the third value and the fourth value of the second phase.

According to an embodiment, a first reference frequency of the first reference clock generator and a second reference frequency of the second reference clock generator are unsynchronized for the distance measurement.

In another embodiment, the nodes are set up to measure the first value of the first phase and the third value of the second phase in a first time interval for a first frequency of the first carrier signal and second carrier signal. Preferably, the nodes are set up to measure the second value of the first phase and the fourth value of the second phase in a second time interval for a second frequency of the first carrier signal and second carrier signal. The first time interval and the second time interval are the same. The first frequency and the second frequency have a frequency difference.

According to an embodiment, the first node has a first frequency divider to provide a first comparison signal from the first reference signal. To this end, a first reference frequency of the first reference signal is divided by a first division factor of the first frequency divider, whereby the phase position of the first reference signal for the first comparison signal is retained.

According to an embodiment, the second node has a second frequency divider to provide a second comparison signal from the second reference signal. To this end, a second reference frequency of the second reference signal is divided by a second division factor of the second frequency divider, whereby the phase position of the second reference signal for the second comparison signal is retained.

Further, a first comparison frequency of the first comparison signal is equal to a first intermediate frequency of a first intermediate frequency signal. Preferably, a second comparison frequency of the second comparison signal is equal to a second intermediate frequency of a second intermediate frequency signal.

Preferably, the first reference frequency of the first reference clock generator is an even multiple of the first comparison frequency. Preferably, the second reference frequency of the second reference clock generator is an even multiple of the second comparison frequency. Preferably, the carrier frequency is an even multiple of the intermediate frequency.

In an embodiment, it is provided that the first node is formed to change the first carrier frequency of the first carrier signal and the second node to change a carrier frequency of the second carrier signal. Preferably, the nodes are set up to change a first multiplier factor of the first phase-locked loop and a second multiplier factor of the second phase-locked loop by the same value. The first multiplier factor of the first phase-locked loop is used to multiply the first reference frequency of the first reference clock generator. The second multiplier factor of the second phase-locked loop is used to multiply the second reference frequency of the second reference clock generator. The objective is to change the first carrier frequency and the second carrier frequency by the same frequency offset, so that the frequency difference between the first carrier frequency and the second carrier frequency remains constant.

According to an embodiment, the nodes are set up for first transmissions of the first carrier signal with the first carrier frequency and the second carrier signal with the second carrier frequency with a time interval and for second transmissions of the first carrier signal with a changed first carrier frequency and the second carrier signal with a changed second carrier frequency with the same time interval. Preferably, the first node and the second node transmit alternately.

The second node is set up for measured data transmission of the measured values of the second phase to the first node. Preferably, the first node is set up to calculate a distance from the values of the first phase and the values of the second phase. In an alternate embodiment, the first node is set up for measured data transmission of the measured values of the first phase to the second node. Preferably, in this respect, the second node is set up to calculate a distance from the values of the first phase and the values of the second phase.

In an embodiment, it is provided that the first node and/or the second node are set up to transmit and evaluate a {standard-compliant} frame for the time synchronization of measurement times.

In an embodiment, the first node and/or the second node can have a control circuit. The control circuit is formed to control the measurement times as a function of the frame for synchronization by means of a timer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Distance measurements in a radio network with multiple nodes can be based on phase measurements. In this case, for example, an unmodulated carrier signal with the frequency fa and an unmodulated carrier signal with the frequency fb are transmitted one after another. The frequencies differ only in a small difference frequency Δφ. In the receiver, the phase of the received wave is evaluated and stored as measured values φ1 and φ2. The distance d between the stations can be calculated from this:

$$d = \frac{(\varphi 2 - \varphi 1)c}{2\pi \Delta f} \quad (1)$$

Here, c is the speed of light.

Figure 1:
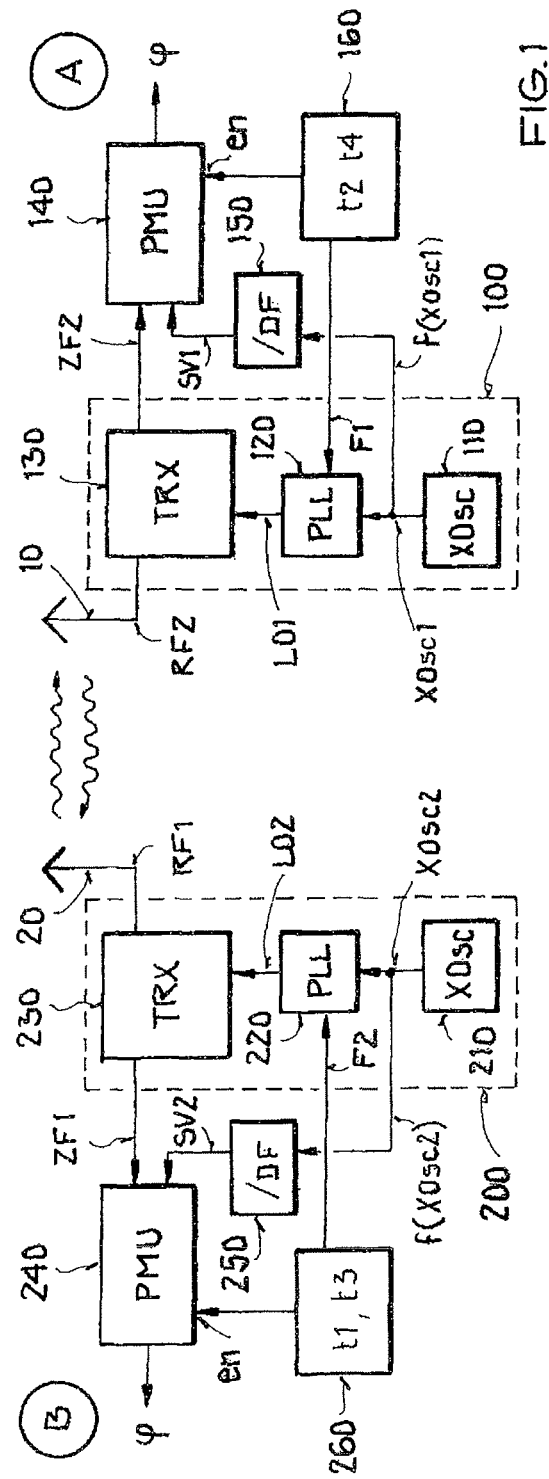
FIG. 1 shows schematic block diagrams of two circuits of nodes of a radio network.

In FIG. 1, two circuits of a first node A and a second node B are shown, whereby none of the nodes A, B function as a mere active reflector. The circuit of the first node A has a transmitter/receiver circuit 130 (TRX) connectable or connected to an antenna 10. The first transmitter/receiver circuit 130 (TRX) is provided by a first crystal oscillator 110 as a reference clock generator (XOSC1) and a first phase-locked loop 120 (PLL) with a first local oscillator signal LO1. The arrangement comprising the first transmitter/receiver circuit 130, first phase-locked loop 120, and first reference clock generator 110 can also be called a radio 100.

The circuit of the first node A furthermore has a first frequency divider 150, which in the exemplary embodiment of FIG. 1 divides the first reference frequency f(XOSC1) of the first reference signal XOSC1 of the first reference clock generator 110 by the first division factor DF, for example, by eight, to provide a first comparison signal SV1 with a first comparison frequency f(SV1) of, for example, about 2 MHz. Inputs of a first phase measurement unit 140 (PMU) of the circuit of the first node A are connected to the first frequency divider 150 and the first transmitter/receiver circuit 130. The first transmitter/receiver circuit 130 is formed for downmixing a second carrier signal RF2, received by second node B, to an intermediate frequency signal ZF2. The intermediate frequency signal ZF2 in the exemplary embodiment of FIG. 1 has an intermediate frequency f(ZF2) of, for example, about 2 MHz.

The phase φ of the received carrier signal RF2 is measured by the first phase measurement unit 140, which can also be called a phase detector. The measurement occurs in an intermediate frequency domain, because during the frequency conversion in a mixer of the first transmitter/receiver circuit 130 the phase position of the second carrier signal RF2 transmitted by second node B is maintained. The first phase' measurement unit 140 is therefore formed to measure the phase difference between the intermediate frequency signal ZF2 and the divided-down reference frequency as the first comparison signal SV1.

In the exemplary embodiment of FIG. 1, the circuit of the second node B is made the same as that of the first node A The circuit of the second node B also has a second transmitter/receiver circuit 230, which can be or is connected to an antenna 20. The second transmitter/receiver circuit 230 is provided by a second crystal oscillator 210 as the second reference clock generator (XOSC2) and a second phase-locked loop 220 with a second local oscillator signal LO2. The arrangement comprising the second transmitter/receiver circuit 230, the second phase-locked loop 220, and the second reference clock generator 210 can also be called a radio 200.

The circuit of the second node B also has a second frequency divider 250 to provide a second reference signal SV2 at an input of a second phase measurement unit 240. The second frequency divider 250 for dividing down the second reference frequency f(XOSC2) of second reference signal XOSC2 of the second reference clock generator 210 by the second division factor DF is connected to the second reference clock generator 210 of the circuit of the second node. The phase φ of the received first carrier signal RF1 is measured using the second phase measurement unit 240. For this purpose, an input of the second phase measurement unit 240 is connected to an output of the second transmitter/receiver circuit 230. The second phase measurement unit 240 is formed to measure the phase difference between an intermediate frequency signal ZF1 and the second comparison signal SV2.

Reference clock generators 110 and 210 are formed as crystal oscillators and decoupled from one another. Because of fabrication variations or different temperatures, the first reference frequency f(XOSC1) of the first reference clock generator 110 of the first node A and the second reference frequency f(XOSC2) of the second reference clock generator 210 of the second node B can deviate from one another. Because the first reference frequency f(XOSC1) of the first reference clock generator 110 of the first node A and the second reference frequency f(XOSC2) of the second reference clock generator 210 of the second node B are unsynchronized, a time synchronization of the measurements of the phase in the first node A and the measurements of the phase in the second node B is especially advantageous to take into account the phase error caused by the frequency offset between the first reference clock generator and the second reference clock generator.

Figure 2A:
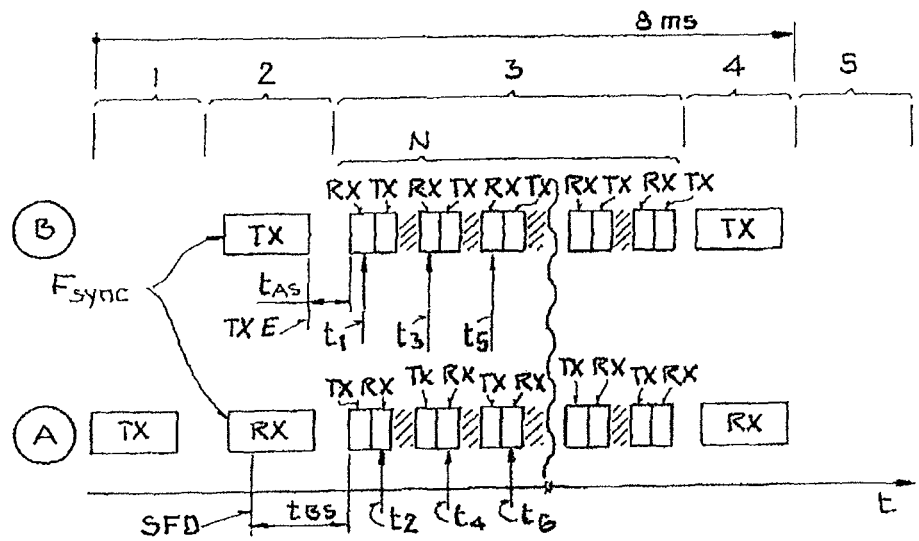
FIGS. 2A-2C show a schematic diagram for the phase determination.
Figure 2B:
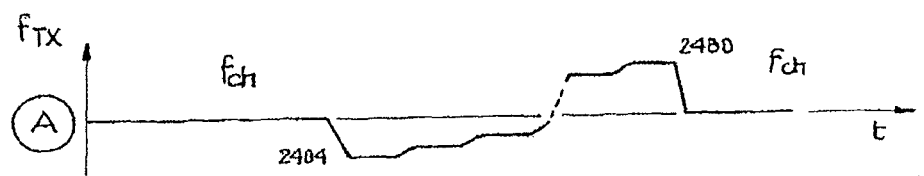

A course of a measurement process is shown schematically as a diagram in FIGS. 2A and 2B. The first node A initializes the distance measurement and in step 1 transmits a frame to the second node B with the command to perform a distance measurement. The transmission frequency fTX in this case is set to the channel frequency fch for communication in the radio network. A sequence of measuring frequencies or frequency steps is transmitted with the frame to the second node B. The measuring frequencies in this regard are the carrier frequencies of the unmodulated carrier signals RF1, RF2. Alternatively, the sequence of the measuring frequencies (carrier frequencies) for a phase measurement can also be fixedly predefined.

In step 2 of the process in FIG. 2A, the second node B transmits a frame Fsync to the first node A for time synchronization of the further process course for the distance measurement. The frame Fsync for time synchronization is, for example, a standard frame, which is formed according to a standard (for example, industry standard IEEE 802.15.4) and may have, for example, a preamble, a data header, and data to be transmitted. No data transmission is necessary for synchronization, so that an empty frame can be transmitted. In this respect, the time necessary for the transmission of the frame Fsync for time synchronization is known, i.e., for the transmission by the second node B and the receiving by the first node A. The time for synchronization is, for example, divided into symbols with a symbol length. The second node starting at end time TXE of the transmitted frame Fsync starts a timer with the length tAS, which ends at the start of the distance measurement The first node A also starts a timer with the length tBS, which also ends at the start of the distance measurement. The timer of the first node A is started by the determination of the time SFD (in industry standard IEEE 802.15.4, this corresponds to an indicator of an end of the preamble in the frame) in the received frame Fsync for the time synchronization.

Proceeding from the end of the timer of the second node B, measurement times t1, t3, t5, etc., for measuring the phase are established. Proceeding from the end of the timer of the first node, measurement times t2, t4, t6, etc., for measuring the phase are established. To determine the distance, it is necessary in this case that the time interval between measurement times t1, t3, t5, etc., in the second node B and the time interval between the measurement times t2, t4, t6, etc., in the first node are the same and constant. The time interval is predefined. The predefined time interval can be fixedly implemented. Alternatively, the time interval for predefining is agreed upon between nodes A, B. Beyond the measurement times shown in FIG. 2A, additional measurement times, which are not shown in the simplified illustration in FIG. 2A, in the same time interval are necessary for the N measurements.

In step 3, the transmission frequency fTX is switched from the preceding communication frequency fch to the lowest frequency. During the times tAS and tBS until the end of the timer, the phase-locked loops of the nodes A, B begin to oscillate. The setting of the lowest frequency, for example, to the value 2404 MHz is shown schematically in FIG. 2B. First, the node A transmits an unmodulated first carrier signal RF1 in the transmission mode TX. In the meantime, the second node B receives the first carrier signal in the receive mode RX and measures a third value of the phase at time t1 and stores the phase value. Next, the second node B transmits an unmodulated second carrier signal RF2 and in the first node A at measurement time t2 a first phase value is measured and stored. Then, the transmission frequency fTX is increased in each case by a frequency step Δφ and the phase-locked loops begin to oscillate anew. Then, at times t3 and t4 new measurements are performed and at time t3 a fourth phase value and at time t4 a second phase value are measured and stored. This process repeats up to the highest frequency in the band, for example, of 2480 MHz. The increase is shown schematically in FIG. 2B. In step 3, therefore, N measurements are taken with different transmission frequencies fTX.

In step 4, both nodes A, B switch back to the network frequency fch. The second node B transmits the measured and stored phase values back to the first node A by means of a standard communication in the radio network. The node A calculates the distance d between the nodes A, B from this phase information and its own phase measurements in step 5.

Figure 2C:
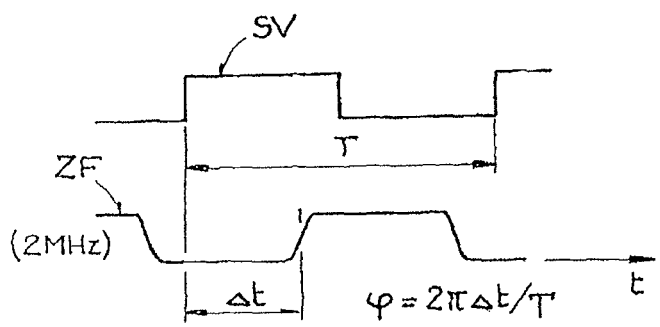

An exemplary embodiment for a phase measurement is shown schematically as a diagram in FIG. 2C. The phase φ is calculated as:

$$\phi = 2\pi \Delta t / T \quad (2)$$

Here, Δt is the time difference between a positive edge of the comparison signal SV and a positive edge of the intermediate frequency signal ZF. T is a period of the comparison signal SV. Accordingly, falling edges of both signals SV, ZF could also be used.

Synchronization of the frequency of both reference generators is not necessary owing to the constant and equal time intervals between the successive measurement times t1, t3, t5 or t2, t4, t6. Thus, with the establishment of the measurement times t1, t3, t5 to one another and t2, t4, 6 to one another, costly frequency control loops can be omitted. The circuit of a node A/B can be greatly simplified and implemented using an industry standard, such as IEEE 802.15.4, without greater expenditure. It is assumed in this case that a phase error, occurring between measurement times t1 and t2, because of the frequency offset between reference clock generators 110 and 210, occurs to the same extent between measurement times t3 and t4, so that these two phase errors can be subtracted from one another.

Figure 3:
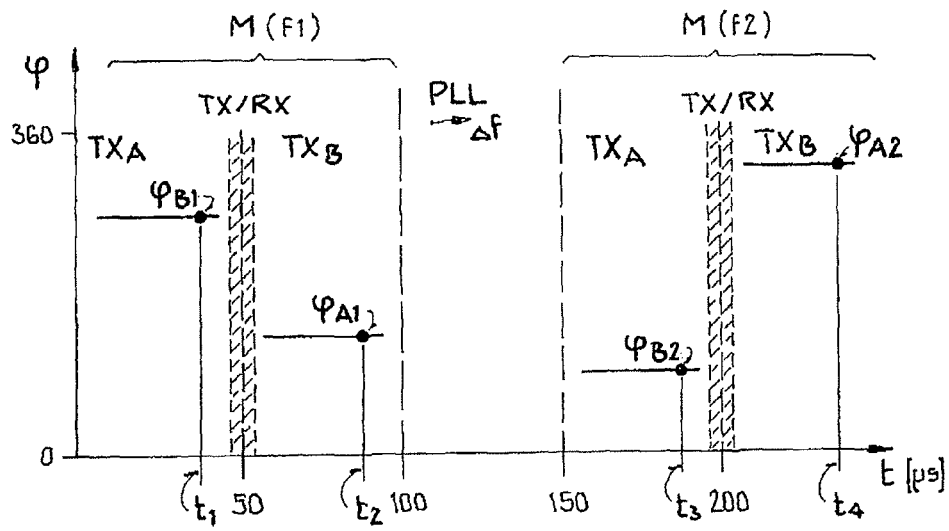
FIG. 3 shows a first schematic diagram with phase measurements of two nodes of a radio network.

A diagram for a measurement process is shown schematically in FIG. 3. In the method for distance measurement between the first node A and the second node B, a first unmodulated carrier signal RF1 with a carrier frequency f1 is transmitted by the first node A and received by the second node B. A second unmodulated carrier signal RF2 with a carrier frequency f1 is transmitted by the second node B and received by the first node A.

A first value φA1 of a first phase is measured at a first measurement time t2 by the first node A. A third value φB1 of a second phase is measured at a third measurement time t1 by the second node B.

This is followed by an increase in the carrier frequency f2 by a frequency difference Δφ to the increased carrier frequency f2. The first unmodulated carrier signal RF1 is transmitted with the increased carrier frequency f2 by the first node A and received by the second node B. The second unmodulated carrier signal RF2 is transmitted with the increased carrier frequency f2 by the second node B and received by the first node A.

A second value φA2 of the first phase is measured at a second measurement time t4 by the first node A. A fourth value φB2 of a second phase is measured at a fourth measurement time t3 by the second node B.

In the purely theoretical case of FIG. 3, there is no frequency offset between the frequencies f(XOSC1), f(XOSC2) of first reference clock generator 110 and of second reference clock generator 210. FIG. 3 is intended to represent first only the theoretical case that the frequencies f(XOSC1), f(XOSC2) of reference clock generators 110, 210 are exactly the same. The measured phase φ is therefore constant during the time t.

In the exemplary embodiment of FIG. 3, the first node A transmits first and the third value φB1 of the second phase is measured at the third time t1 in the second node B. Then, the second node B transmits and the first value φA1 of the first phase is measured at the first time t2 in the first node A. Between the phase measurements M(f1), the nodes A, B switch between transmission and reception TX/RX. Both measurements in the theoretical case of FIG. 3 are made at frequency f1.

The carrier frequency is then increased by the same frequency amount Δf in both circuits of the nodes A, B. The phase-locked loops 120, 220 require, for example, 50 μs or less to begin to oscillate. Both phase measurements M(f2) are then repeated at times t3 and t4 for the frequency f2, whereby the second phase value φA2 of the first phase is determined in the first node A and the fourth phase value φB2 of the second phase in the second node B. Thus, the first value φA1 of the first phase and the third value φB1 of the second phase are assigned the same carrier frequency f1. The second value φA2 of the first phase and the fourth value φB2 of the second phase are also assigned the same increased carrier frequency f2.

A phase difference Δφ can be calculated from the phase values φA1, φB1, φA2, and φB2 as follows:

$$\Delta\phi = (\phi_{A2} - \phi_{B2}) - (\phi_{A1} - \phi_{B1}) \quad (3a)$$

By transformation, one obtains:

$$\Delta\phi = (\phi_{A2} - \phi_{A1}) - (\phi_{B2} - \phi_{B1}) \quad (3b)$$

Thus, the distance d can be calculated as follows:

$$d = \frac{\Delta\varphi c}{\pi \Delta f} \quad (4)$$

Figure 4:
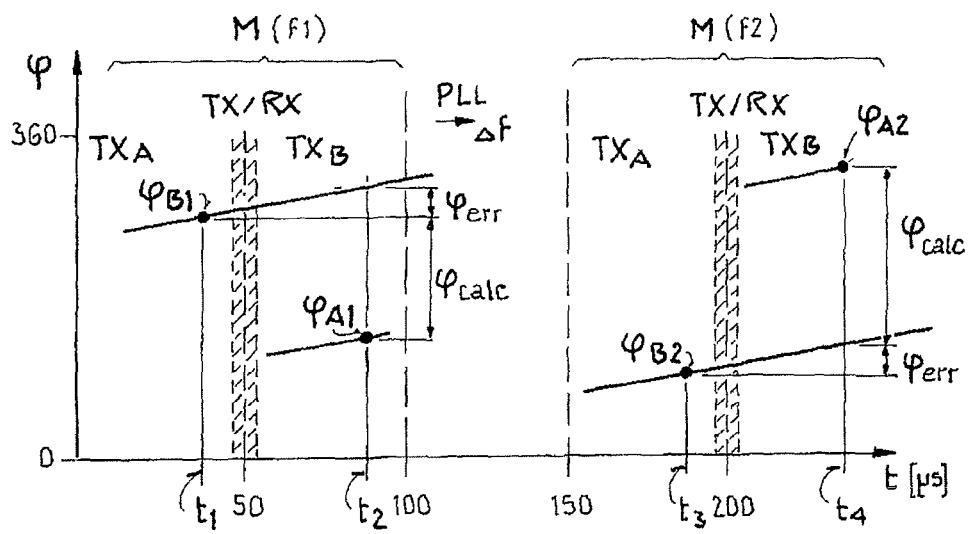
FIG. 4 shows a second schematic diagram with phase measurements of two nodes of a radio network.

In a departure from the theoretical presentation in FIG. 3, in reality the nodes A, B will have reference clock generators 110, 210, whose frequencies f(XOSC1), f(XOSC2) have a frequency offset, for example, because of fabrication tolerances or different temperatures. As a result, the phase φ in the specifically receiving node changes, as is shown schematically by the slopes of the phase profiles in FIG. 4.

The phase change in the measurement M(f1) between the measurement times t1 and t2 causes a phase error yen at a specific phase φalc. The same phase error φerr arises in the measurement M(f2) at measurement times t3 and t4, when a time interval between the phase measurement M(f1), M(f2) is sufficiently small. If the time intervals t2−t1 and t4−t3 or the time intervals t3−t1 and t4−t2 are the same, the phase error φerr is also the same and drops out during the calculation of the phase difference Δφ (see Equation (3a/3b)). As a result, the distance measurement can also be used based on the phase measurement, when reference clock generators 110, 210 of both nodes A, B are unsynchronized, as in the exemplary embodiment of FIG. 1.

FIG. 1 shows that the circuit of the first node A has a first control circuit 160. The first control circuit 160 is set up to trigger the measurement of the phase φ at at least two predefined times t2, t4. To control the phase measurement at the at least two predefined times t2, t4, the first control circuit 160 is connected, for example, to a control input en of the first phase measurement unit 140. For example, at the at least two predefined times t2 and t4, a value of the phase φ is calculated or at the at least two predefined times t2 and t4, the current value of the continuously calculated phase φ is stored.

The circuit of the second node 8 also has a second control circuit 260. The second control circuit 260 is set up to trigger the measurement of the phase φ at at least two predefined times t1, t3. To control the phase measurement at the at least two predefined times t1, t3, the second control circuit 260 is connected, for example, to a control input en of the second phase measurement unit 240.

A time interval between the at least two predefined times t2, t4 of control circuit 160 in the first node A and a time interval between the at least two predefined times t1, t3 of control circuit 260 in the second node B are the same in this case. Therefore, a time interval between the phase measurements M(f1) of the first frequencies and a time interval between the phase measurements M(f2) of the second modified frequencies are also the same. If additional phases at additional carrier frequencies are to be measured, then, these as well are controlled by control circuits 160, 260 in the same time interval.

Furthermore, the first control circuit 160 of the first node A is set up to control a first multiplication factor F1 in the first phase-locked loop 120. The second control circuit 260 of the second node B is set up to control a second multiplication factor F2 in the second phase-locked loop 220 of the second node B. The same frequencies or frequencies differing by an offset of oscillator signals LO1, LO2 of the first node A and of the second node B are controlled by the multiplication factors F1, F2. For example, the frequencies of oscillator signals LO1, LO2 are changed in steps.

The invention is not limited to the shown embodiment variants in FIGS. 1 through 4. The functionality of the system of a radio network is advantageously used for a radio system according to the industry standard IEEE 802.15.4 or according to the industry standard IEEE 802.15.1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method, comprising:
transmitting, by a first node, a first carrier signal;
receiving, from a second node, a second carrier signal;
measuring, by the first node, a first value and a second value of a first phase, the first value of the first phase assigned to a first frequency of the received second carrier signal and the second value of the first phase assigned to a second frequency of the received second carrier signal, the first frequency and the second frequency having a frequency difference, a third value of a second phase assigned to a third frequency of the first carrier signal, a fourth value of the second phase assigned to a fourth frequency of the first carrier signal, the third frequency and the fourth frequency having the frequency difference; and
determining a distance between the first node and the second node from the frequency difference from the first value and the second value of the first phase and from the third value and the fourth value of the second phase.

2. The method of claim 1, further comprising performing a time synchronization of the measurements of the values so that measurement times of the measurements of the values have a predefined temporal relationship to one another.

3. The method of claim 1, wherein:
a first time interval between a first measurement time of the first value of the first phase and a second measurement time of the second value of the first phase are defined;
a second time interval between a third measurement time of the third value of the second phase and a fourth measurement time of the fourth value of the second phase are defined; and
the first time interval and the second time interval are the same.

4. The method of claim 1, wherein determining the distance comprises calculating, from the first value and the second value of the first phase and from the third value and fourth value of the second phase, a phase difference according to the formula:

$$\Delta\phi=(\phi_{A2}-\phi_{B2})-(\phi_{A1}-\phi_{B1})$$

or its algebraic transformations, φA1 being the first value of the first phase, φA2 being the second value of the first phase, φB1 being the third value of the second phase, and φB2 being the fourth value of the second phase.

5. The method of claim 1, wherein:
the first carrier signal is generated by a first oscillator signal generated by a first reference clock generator and a first phase-locked loop of the first node;
the second carrier signal is generated by a second oscillator signal generated by a second reference clock generator and a second phase-locked loop of a second node;
the first value and the second value of the first phase of the received second carrier signal of the second node are measured relative to a first reference signal of the first reference clock generator by a phase measurement unit of the first node; and
the third value and the fourth value of the second phase of the first carrier signal of the first node are measured relative to a second reference signal of the second reference clock generator by a phase measurement unit of the second node.

6. The method of claim 5, comprising compensating a phase error caused by a generated first reference frequency of the first reference signal and a generated second reference frequency of the second reference signal by performing operations comprising subtracting the second value from the first value of the first phase and the fourth value from the third value of the second phase.

7. The method of claim 1, wherein the first and second carrier signals are transmitted according to industry standard Institute of Electrical and Electronics Engineers (IEEE) 802.15.1.

8. The method of claim 1, wherein the first and second carrier signals are transmitted according to industry standard Institute of Electrical and Electronics Engineers (IEEE) 802.15.4.

9. A first node of a radio network, the first node comprising:
a transmitter circuit configured to transmit a first carrier signal;
a receiver circuit configured to receive, from a second node, a second carrier signal;
a first phase measurement unit configured to measure a first value and a second value of a first phase, the first value of the first phase assigned to a first frequency of the received second carrier signal and the second value of the first phase assigned to a second frequency of the received second carrier signal, the first frequency and the second frequency having a frequency difference, a third value of a second phase assigned to a third frequency of the first carrier signal, a fourth value of the second phase assigned to a fourth frequency of the first carrier signal, the third frequency and the fourth frequency having the frequency difference; and
circuitry configured to determine a distance between the first node and the second node from the frequency difference from the first value and the second value of the first phase and from the third value and the fourth value of a second phase.

10. The first node of claim 9, wherein one or more of the first node and the second node are configured to transmit a frame for time synchronization of measurement times.

11. The first node of claim 10, wherein one or more of the first node and the second node comprises a control circuit that is configured to control the measurement times based on the frame for time synchronization by a timer.

12. The first node of claim 9, wherein:
a first control circuit of the first node is configured to control a first measurement time of the first value of the first phase and a second measurement time of the second value of the first phase;
a second control circuit of the second node is configured to control a second time interval between a third measurement time of the third value of the second phase and a fourth measurement time of the fourth value of the second phase are defined; and
a first time interval between the first measurement time and the second measurement time and a second time interval between the third measurement time and the fourth measurement time are the same.

13. The first node of claim 9, wherein the circuitry is configured to determine the distance by performing operations comprising calculating, from the first value and the second value of the first phase and from the third value and fourth value of the second phase, a phase difference according to the formula:

$$\Delta\phi = (\phi_{A2} - \phi_{B2}) - (\phi_{A1} - \phi_{B1})$$

or its algebraic transformations, $\phi A1$ being the first value of the first phase, $\phi A2$ being the second value of the first phase, $\phi B1$ being the third value of the second phase, and $\phi B2$ being the fourth value of the second phase.

14. The first node of claim 9, wherein:
the first node comprises a first reference clock generator for a first phase-locked loop for generating a first oscillator signal for generating the first carrier signal, the second node comprising a second reference clock generator for a second phase-locked loop for generating a second oscillator signal for generating the second carrier signal; and
the first phase measurement unit is configured to measure the first value and the second value of the first phase of the received second carrier signal relative to a first reference signal of the first reference clock generator, the second node comprising a second phase measurement unit configured to measure the third value and the fourth value of a second phase of the first carrier signal relative to a second reference signal of the second reference clock generator.

15. The first node of claim 14, wherein a phase error caused by a generated first reference frequency of the first reference signal and a generated second reference frequency of the second reference signal is compensated by performing operations comprising subtracting the second value from the first value of the first phase and the fourth value from the third value of the second phase.

16. The first node of claim 14, wherein:
the first node is configured to change a carrier frequency of the first carrier signal;
the second node is configured to change a carrier frequency of the second carrier signal; and
the first node is configured to change by the same value a first multiplier factor of the first phase-locked loop for multiplying the first reference frequency of the first reference clock generator, the second node being configured to change a second multiplier factor for multiplying the second reference frequency of the second reference clock generator of the second phase-locked loop.

17. The first node of claim 9, wherein one or more of the following is true:
the second node is configured for measured data transmission of the measured values of the second phase to the first node; and
the first node is configured for measured data transmission of the measured values of the first phase to the second node.

18. The first node of claim 9, wherein the first and second carrier signals are transmitted according to industry standard Institute of Electrical and Electronics Engineers (IEEE) 802.15.1.

19. The first node of claim 9, wherein the first and second carrier signals are transmitted according to industry standard Institute of Electrical and Electronics Engineers (IEEE) 802.15.4.

* * * * *

UNITED STATES PATENT AND TRADEMARK OFFICE
CERTIFICATE OF CORRECTION

PATENT NO. : 8,965,301 B2
APPLICATION NO. : 14/170939
DATED : February 24, 2015
INVENTOR(S) : Wolfram Kluge and Eric Sachse It is certified that error appears in the above-identified patent and that said Letters Patent is hereby corrected as shown below:

In the Specification

Col. 8, line 32, delete "{standard-" and insert -- (standard- --, therefor.

Col. 9, line 48, delete "phase'" and insert -- phase --, therefor.

Col. 12, line 11, delete "12" and insert -- f2 --, therefor.

Col. 13, line 7, delete "yen" and insert -- φerr --, therefor.

Col. 13, line 29, delete "8" and insert -- B --, therefor.

Col. 13, line 54, delete "Bare" and insert -- B are --, therefor.

Signed and Sealed this
First Day of September, 2015

Michelle K. Lee
*Director of the United States Patent and Trademark Office*